Patented Feb. 28, 1928.

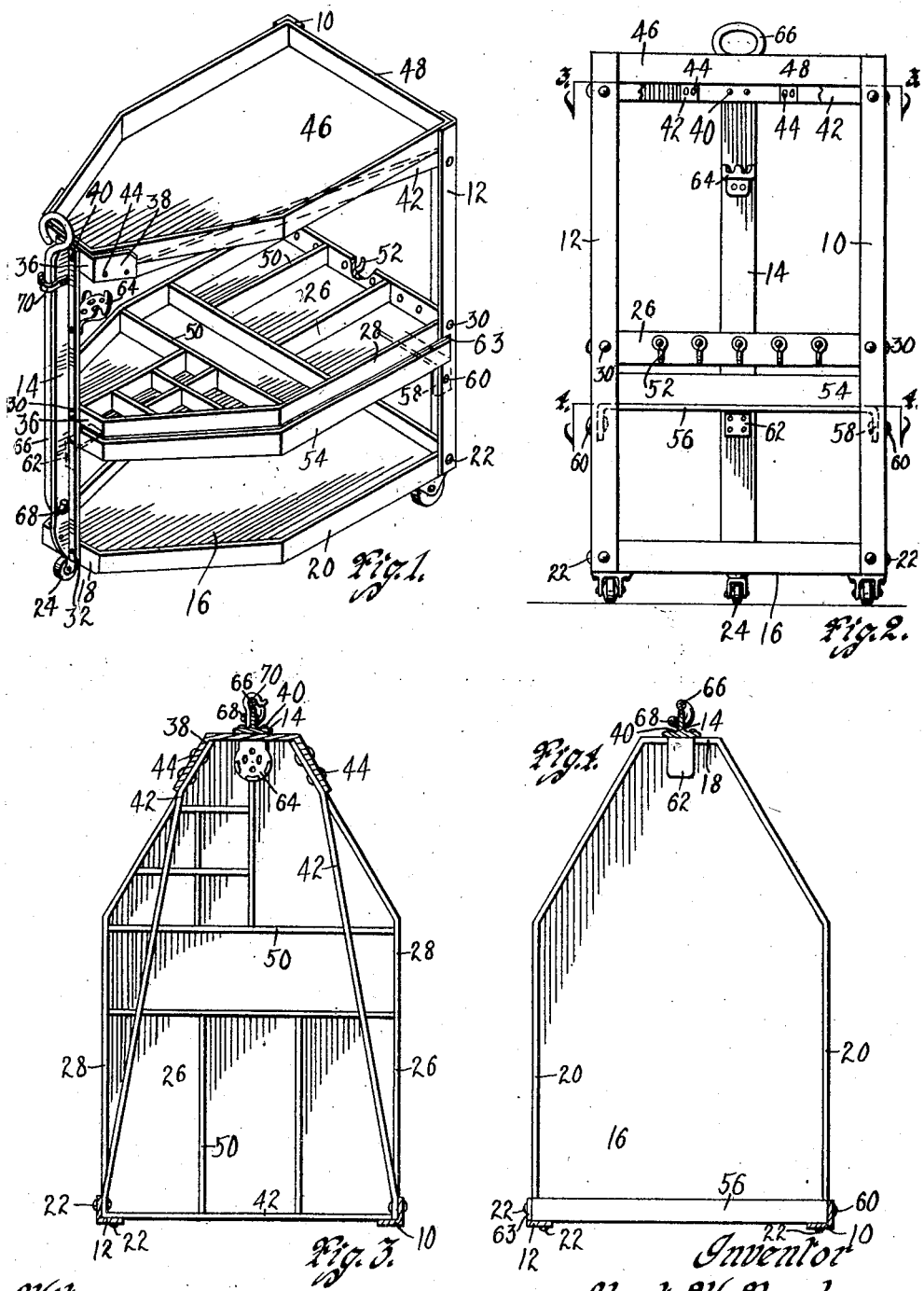

1,660,521

UNITED STATES PATENT OFFICE.

ALGOT W. NORDGREN, OF ST. PAUL, MINNESOTA, ASSIGNOR TO MARQUETTE MANUFACTURING COMPANY, OF ST. PAUL, MINNESOTA.

PORTABLE TOOL STAND.

Application filed October 4, 1926. Serial No. 139,360.

The object of my invention is to provide a portable tool stand especially adapted for use in connection with service work in garages upon automobiles, the parts of the tool stand being simple, durable and comparatively inexpensive.

More particularly it is my object to provide a tool stand having certain fixed members and certain removable members, the fixed members or shelves forming a portion of the frame work of the entire tool stand and enabling the removable members or shelves to be supported in proper position upon the completed tool stand.

Still a further object is to provide a pan shaped member removably supported upon the tool stand and capable of being withdrawn therefrom for use in catching oil drippings from an automobile engine when work of any kind is being done upon the engine.

Still a further object is to so arrange the uprights and frame portions of the tool stand so as to enable a pan member to be supported upon the frame and held thereon without the use of any fastening elements.

With these and other objects in view, my invention consists in the construction, arrangement, and combination of the various parts of my portable tool stand, whereby the objects contemplated are attained, as hereinafter more fully set forth, pointed out in my claims, and illustrated in the accompanying drawings, in which:

Figure 1 is a perspective view of my improved portable tool stand.

Figure 2 is a rear end view of the same.

Figure 3 is a sectional view taken on lines 3—3 of Figure 2, and

Figure 4 is a sectional view taken on line 4—4 of Figure 2.

My entire tool stand is substantially triangular shaped or rather its front end is tapered so as to enable the entire tool stand to be mounted upon three wheels, the front one of which may be a swivel wheel and the two rear wheels ordinary caster wheels.

My tool stand includes a pair of corner uprights 10 and 12. The uprights 10 and 12 form the rear corner members of the frame work of the tool stand and are in the form of angle bars opening towards each other.

The third upright 14 is T-shaped and forms the front support or upright of the frame. The flat side of the upright 14 faces the two angle bars or uprights 10 and 12.

In order to connect the uprights 10, 12 and 14 together and at the same time to serve as a support for tools or the like, I provide a bottom pan shaped element 16. The pan shaped element 16 has its forward corners tapered towards each other so that a short forward wall or flange 18 is provided which is riveted or otherwise fastened to the upright 14.

The entire periphery of the pan or shelf 16 is formed with an upturned flange 20, thus giving to the member 16 its pan like shape.

The angle uprights 10 and 12 have their lower ends secured to the pan element 16 particularly to the flanges 20 thereof by the rivets or the like 22. Adjacent each of the lower ends of the uprights 10 and 12 and secured to the underside of the pan element 16 are the rear supporting wheels 24.

Adjacent the lower end of the upright 14 and secured to the pan element 16 is a front swivel wheel 24. An intermediate pan shape member or element 26 is connected to the uprights 10, 12 and 14. The pan shaped element 26 is of the same shape in outline and of the same size as the pan element 16.

The uprights 10 and 12 are secured to flanges 28 of the pan element 26 by rivets or the like 30. The front wall or flange of the pan element 26 is secured to the upright 14 by rivets or the like 30.

The lower or bottom pan element has its front wall 18 secured to the upright 14 by rivets or the like 32. The bottom and intermediate pan or shelf members are fixed relative to the uprights 10, 12 and 14 and together therewith form the frame of the tool stand.

Secured to the upper end of the upright 14 is a strap member 36 having two side extensions 38. The strap member 36 is secured to the upper end of the upright 14 by rivets or the like 40. The side extensions 38 are connected to the uprights 10 and 12 through a strap iron 42. The strap iron 42 is bent substantially U-shaped as illustrated in Figure 3 of the drawings and has its corners projecting into the corners of the angle uprights 10 and 12 and thus form a connecting member between the two uprights 10 and 12 at the back side of the device and at the same time form a connecting means between the uprights 10 and 12 and the upright 14.

The ends of the strap member 42 are fastened to the side extensions 38 by rivets or the like 44. It will be noted that the strap member 42 has its two side portions inclined from the uprights 10 and 12 toward the side extensions 38 and do not follow the outline of the pan elements 16 or 26.

The purpose of so arranging the strap member 42 is to have it provide a shelf or support for a top pan element or shelf 46. The pan element 46 rests upon the two sides of the strap member 42 and at the same time fits into the corners formed by the angle uprights 10 and 12 and into the substantially U-shaped receiving portion formed by the strap member 36 and its two side extensions 38 as clearly illustrated in Figure 1 of the drawings.

The pan element 46 is formed with an upturned peripheral flange 48. The pans 16, 26 and 46 are of the same size and shape. The pan element 46 may be removed by simply lifting it upwardly until it clears the uprights 10 and 12 and the strap member 36.

The pan element 26 which is the intermediate one may be provided with suitable partitions 40 for forming a number of compartments of various sizes for receiving small tools and small accessories for use in connection with service work on automobiles and the like.

On the back flange of the pan element 26 I place a number of hooks 52 for permitting various tools or the like to be supported therefrom.

I mount a drip pan 54 upon the frame of my tool stand directly below the intermediate pan 26, the drip pan being of the same size and shape as the other pans or shelves of my tool stand.

In order to removably mount the pan 54 I connect the two back uprights 10 and 12 together by a strap iron 56. The strap iron 56 simply has its flat side up and serves as a support for one end of the pan 54.

The ends of the strap iron are bent downwardly so as to provide short flanges 58 which may be connected to the uprights 10 and 12 by rivets or the like 60. The forward end of the pan 54 is supported upon an angle bracket 62. The angle bracket 62 is riveted or otherwise fastened to the upright 14.

One of the side flanges of the upright 12 is notched as at 63 for permitting the pan 54 to be slid therethrough.

It will be noted that when the pan 54 is slid upon the strap support 56 it permits the entire pan 54 to be positioned just below the pan 26. One of the corners of the pan 54 is received in the corner formed by the angle bar 10 and when the pan 54 engages the two side flanges of the angle bar 10 it remains in position upon the frame.

The pan 54 may be used for catching any oil or used as an ordinary drain pan for draining engine oil. The pan elements 16 and 46 are designed to receive any large tools or parts of the automobile being repaired while the intermediate pan may receive any tools or small accessory parts.

An oil can holder 64 is mounted upon the upright 14 and may receive an ordinary oil can. In order to wheel the entire tool stand from place to place I provide a tongue 66 having a hook 68 at its lower end extended through an opening formed in the upright 14 as clearly illustrated in Figure 1 of the drawings.

A spring clip 70 mounted upon the upright 14 is designed to receive and hold the upper end of the tongue 66 against the upright 14 when the tool stand is not being pulled from place to place. The upper end of the handle 66 includes a hand hold or loop of the ordinary kind.

My tool stand is simple and yet efficient. It gives me a construction where portions of the structure serve to support and retain other parts of the device.

Some changes may be made in the construction and arrangement of the parts of my device without departing from the real spirit and purpose of my invention, and it is my intention to cover by my claims, any modified forms of structure or use of mechanical equivalents, which may be resonably included within their scope.

I claim as my invention:

1. A portable tool stand comprising a plurality of upright members, two of said upright members being angle-shaped, a bottom pan element for connecting said upright members together at their lower ends, a frame inside said upright members for connecting them together just below their upper ends whereby the frame serves as a support and portions of said upright members project above said frame, a top pan element adapted to be removably supported upon said frame and having two of its corners engaging said angle shaped upright member, the portions of said upright members projecting above said frame preventing lateral movement of said top pan element, a supporting bar connecting the angle shaped upright members together and a supporting clip secured to the third upright member, a removable intermediate pan element mounted upon said supporting bar and clip, one of said two angle shaped upright members having a notch therein above said supporting bar for allowing said intermediate pan to be slid therethrough for positioning it upon its supporting bar and clip and a second intermediate pan element fixed relative to said upright members for covering said removable intermediate pan element.

2. A portable tool stand comprising a plurality of upright members, two of said upright members being angle-shaped, a bottom pan element for connecting said upright members together at their lower ends, a frame inside said upright members for connecting them together just below their upper ends whereby the frame serves as a support and portions of said upright members project above said frame, a top pan element adapted to be removably supported upon said frame and having two of its corners engaging said angle shaped upright member, the portions of said upright members projecting above said frame preventing lateral movement of said top pan element, a supporting bar connecting the angle shaped upright members together and a supporting clip secured to the third upright member, a removable intermediate pan element mounted upon said supporting bar and clip, one of said two angle shaped upright members having a notch therein above said supporting bar for allowing said intermediate pan to be slid therethrough for positioning it upon its supporting bar and clip.

Des Moines, Iowa, September 22, 1926.

ALGOT W. NORDGREN.